United States Patent
Tokunaga et al.

(10) Patent No.: US 10,693,224 B2
(45) Date of Patent: Jun. 23, 2020

(54) RADIO-WAVE TRANSMITTING COVER AND METHOD FOR SETTING THICKNESS OF RADIO-WAVE TRANSMITTING COVER

(71) Applicant: TOYODA GOSEI CO., LTD., Kiyosu-shi, Aichi-ken (JP)

(72) Inventors: Seiya Tokunaga, Kiyosu (JP); Hideto Maeda, Kiyosu (JP); Kenji Isobe, Kiyosu (JP); Koji Okumura, Kiyosu (JP); Kimihiro Iimura, Kiyosu (JP); Tatsuya Oba, Kiyosu (JP)

(73) Assignee: TOYODA GOSEI CO., LTD., Aichi-pref. (JP)

( * ) Notice: Subject to any disclaimer, the term of this patent is extended or adjusted under 35 U.S.C. 154(b) by 141 days.

(21) Appl. No.: 15/787,144

(22) Filed: Oct. 18, 2017

(65) Prior Publication Data
US 2018/0115059 A1 Apr. 26, 2018

(30) Foreign Application Priority Data

Oct. 24, 2016 (JP) .................................. 2016-207935

(51) Int. Cl.
*H01Q 1/42* (2006.01)
*G01S 7/03* (2006.01)
(Continued)

(52) U.S. Cl.
CPC .............. *H01Q 1/422* (2013.01); *G01S 7/032* (2013.01); *G01S 13/931* (2013.01);
(Continued)

(58) Field of Classification Search
CPC .......... H01Q 1/42; H01Q 1/422; H01Q 1/425; H01Q 1/243; H01Q 1/38; H01Q 1/421–424; G01S 13/931
(Continued)

(56) References Cited

U.S. PATENT DOCUMENTS 6,496,138 B1 * 12/2002 Honma ................. G01S 13/931
342/27
9,533,627 B2 1/2017 Sugiura et al.
(Continued)

FOREIGN PATENT DOCUMENTS

DE 10 2008 036 011 A1 2/2010
DE 10 2011 076 501 A1 11/2012
(Continued)

OTHER PUBLICATIONS

Alan F. Kay, "Radomes and Absorbers". Antenna Engineering Handbook, 1st edition. Chapter 32, pp. 32-1 to 32-40, McGraw-Hill Book Company, 1961.
(Continued)

*Primary Examiner* — Ricardo I Magallanes
(74) *Attorney, Agent, or Firm* — Posz Law Group, PLC

(57) ABSTRACT

A radio-wave transmitting cover is configured to be arranged in the path of the radio wave of a radio-wave radar device. The thickness of the cover is set to a reference thickness at a reference position where the incident angle of the radio wave from the radio-wave radar device is 0°. The reference thickness is set to a value obtained by multiplying half of the wavelength of the radio wave by an integer. In the area around the reference position, the thickness of the cover is gradually changed such that the greater the distance from the reference position, the greater becomes the difference by which the thickness of the cover is larger than the reference thickness.

3 Claims, 5 Drawing Sheets

(51) Int. Cl.
  *G01S 13/931* (2020.01)
  *B60R 13/00* (2006.01)
  *H01Q 1/32* (2006.01)
  *G01S 7/02* (2006.01)

(52) U.S. Cl.
  CPC ....... *B60R 13/005* (2013.01); *G01S 2007/027* (2013.01); *G01S 2013/93271* (2020.01); *H01Q 1/3233* (2013.01)

(58) Field of Classification Search
  USPC .......................................... 343/872, 702, 789
  See application file for complete search history.

(56) References Cited

U.S. PATENT DOCUMENTS

| | | | |
|---|---|---|---|
| 2010/0085271 A1* | 4/2010 | Tajima | ................. B60R 13/005 343/872 |
| 2011/0006965 A1* | 1/2011 | Kits van Heyningen | ................... H01Q 1/42 343/841 |
| 2015/0076851 A1 | 3/2015 | Sugiura et al. | |
| 2015/0207217 A1* | 7/2015 | Fujita | ................... H01Q 1/3233 343/872 |
| 2016/0111776 A1 | 4/2016 | Okumura et al. | |

FOREIGN PATENT DOCUMENTS

| | | |
|---|---|---|
| JP | 2012-112660 A | 6/2012 |
| JP | 2015-054648 A | 3/2015 |
| JP | 2015-066998 A | 4/2015 |
| JP | 2016-080479 A | 5/2016 |

OTHER PUBLICATIONS

Office action dated Dec. 3, 2019 issued in corresponding JP patent application No. 2016-207935 (and English translation).

\* cited by examiner

RADIO-WAVE TRANSMITTING COVER AND METHOD FOR SETTING THICKNESS OF RADIO-WAVE TRANSMITTING COVER

BACKGROUND OF THE INVENTION

The present invention relates to a radio-wave transmitting cover arranged in a radio wave path of a radio-wave radar device and to a method for setting the thickness of the radio-wave transmitting cover.

Recent automobiles are equipped with a millimeter wave radar device (hereinafter, referred to as a radar device) for detecting the distances to surrounding automobiles and obstacles. Such a radar device is mounted on the back of the emblem on the front side or on the back of the front grille of an automobile (for example, Japanese Laid-Open Patent Publication No. 2016-80479). In this case, the emblem or the like functions as a radio-wave transmitting cover (hereinafter, referred to as a cover), through which the millimeter waves pass. Conventionally, to suppress the attenuation of the radio waves passing through the cover in order to improve the detection accuracy, the thickness of the cover is set in the following manner. That is, the thickness is made even and set to a value that is obtained by multiplying, by an integer, half of the wavelength of the radio wave of a radar device (the millimeter wave).

In such a conventional cover, the thickness is set to an even thickness as described above. This effectively reduces the attenuation of radio waves incident at an incident angle of 0° with respect to the cover when the radio waves pass through the cover. That is, the attenuation of the radio waves incident at a right angle with respect to the cover when passing through the cover is effectively reduced. However, when attempting to widen the angular range of detection of the radar device, the incident angle increases, and the attenuation of radio waves when passing through the cover increases. It is thus difficult to increase the detection accuracy of the radar device near the outer edge of the angular range of detection.

SUMMARY OF THE INVENTION

Accordingly, it is an objective of the present invention to provide a radio-wave transmitting cover and a method for setting the thickness of the radio-wave transmitting cover that are capable of increasing the angular range of detection of the radio radar device.

To achieve the foregoing objective and in accordance with one aspect of the present invention, a radio-wave transmitting cover is provided, which is configured to be arranged in a path of a radio wave of a radio-wave radar device. A thickness of the cover is set to a reference thickness at a reference position where an incident angle of the radio wave from the radio-wave radar device is 0°. The reference thickness is set to a value obtained by multiplying half of a wavelength of the radio wave by an integer. In an area around the reference position, the thickness of the cover is gradually changed such that the greater a distance from the reference position, the greater becomes a difference by which the thickness of the cover is larger than the reference thickness.

To achieve the foregoing objective and in accordance with another aspect of the present invention, a method for setting a thickness of a radio-wave transmitting cover is provided. The cover is configured to be arranged in a path of a radio wave of a radio-wave radar device. The method includes setting the thickness at each position of the cover based on the following (Expression 1) to (Expression 8) that are satisfied among an incident angle at the position of a radio wave from the radio-wave radar device, the thickness of the cover, and an attenuation of the radio wave, such that the radio wave attenuation, which changes periodically according to the thickness of the cover, has a local minimum.

$$\text{attenuation} = |2 \times \text{transmittance}| \quad \text{(Expression 1)}$$

$$\text{transmittance} = -20 \log \tau \quad \text{(Expression 2)}$$

$$\tau = \frac{(1-\gamma^2)\exp(-\varphi L_0 - j\varphi)}{1-\gamma^2 \exp(-2\varphi L_0 - 2j\varphi)} \quad \text{(Expression 3)}$$

$$\varphi = \frac{2\pi d}{\lambda}\left(\frac{\varepsilon}{\varepsilon_0} - \sin^2\theta\right)^{1/2} \text{ radians} \quad \text{(Expression 4)}$$

$$L_0 = \frac{(\varepsilon/\varepsilon_0)\tan\delta}{2(\varepsilon/\varepsilon_0 - \sin^2\theta)} \quad \text{(Expression 5)}$$

$$\gamma = \frac{1 - \sqrt{\varepsilon_e} + jL_1}{1 + \sqrt{\varepsilon_e} - jL_1} \quad \text{(Expression 6)}$$

$$\varepsilon_e = \begin{cases} \frac{(\varepsilon/\varepsilon_0) - \sin^2\theta}{\cos^2\theta} & \text{(perpendicular polarization)} \\ \frac{(\varepsilon/\varepsilon_0)^2 \cos^2\theta}{(\varepsilon/\varepsilon_0) - \sin^2\theta} & \text{(parallel polarization)} \end{cases} \quad \text{(Expression 7)}$$

$$L_1 = \begin{cases} \frac{(\varepsilon/\varepsilon_0)\tan\delta}{2\cos\theta[(\varepsilon/\varepsilon_0) - \sin^2\theta]^{1/2}} & \begin{pmatrix}\text{perpendicular}\\ \text{polarization}\end{pmatrix} \\ \frac{(\varepsilon/\varepsilon_0)\tan\delta[(\varepsilon/\varepsilon_0) - 2\sin^2\theta]\cos\theta}{2[(\varepsilon/\varepsilon_0) - \sin^2\theta]^{3/2}} & \begin{pmatrix}\text{parallel}\\ \text{polarization}\end{pmatrix} \end{cases} \quad \text{(Expression 8)}$$

in (Expression 1) to (Expression 8),
τ: transmission coefficient of cover
φ: phase
$L_0$: attenuation by loss
λ: wavelength of radio wave
d: thickness of cover
ε: permittivity of cover
$\varepsilon_0$: permittivity of vacuum
θ: incident angle of radio wave
tan δ: dielectric loss tangent of cover
$\varepsilon_e$: transmission relative permittivity
γ: Fresnel reflection coefficient
$L_1$: reluctance due to loss of vertical polarization To achieve the foregoing objective and in accordance with another aspect of the present invention, a method for setting a thickness of a radio-wave transmitting cover is provided. The cover is configured to be arranged in a path of a radio wave of a radio-wave radar device. The method includes: forming vertical surface portions at a plurality of positions on a back of the cover, wherein the radio wave is vertically incident on each of the vertical surface portions; and setting the thickness of the cover at each position such that the thickness of the cover in a normal direction of each vertical surface portion is obtained by multiplying half of a wavelength of the radio wave by an integer.

DETAILED DESCRIPTION OF THE PREFERRED EMBODIMENTS

First Embodiment

A radio-wave transmitting cover and a method for setting the thickness of the radio-wave transmitting cover according to a first embodiment will now be described with reference to FIGS. 1 to 5.

Figure 1:
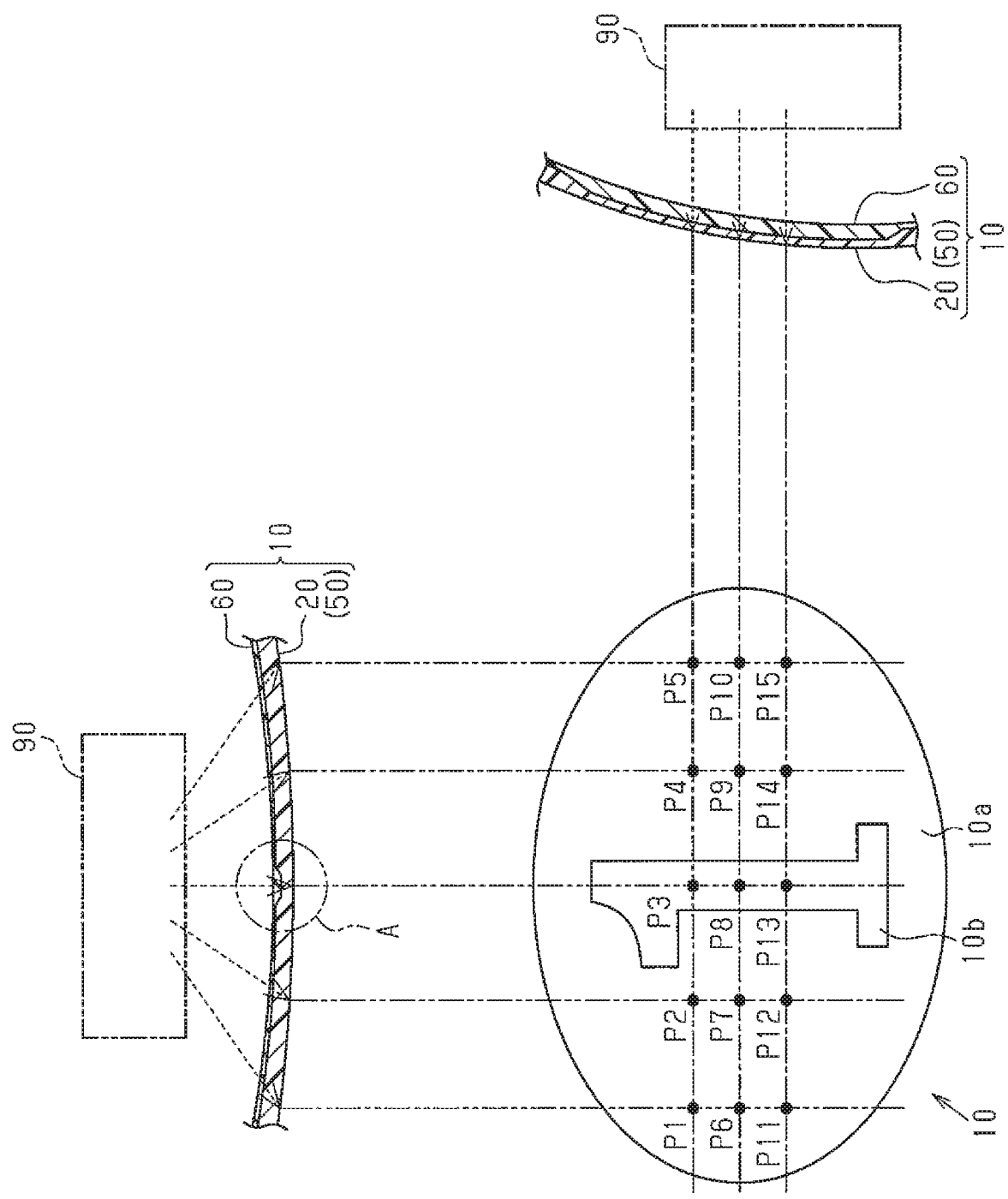
FIG. 1 is an explanatory diagram of a radio-wave transmitting cover and a method for setting the thickness of the radio-wave transmitting cover according to a first embodiment, showing positions P1 to P15 on the cover.
Figure 2:
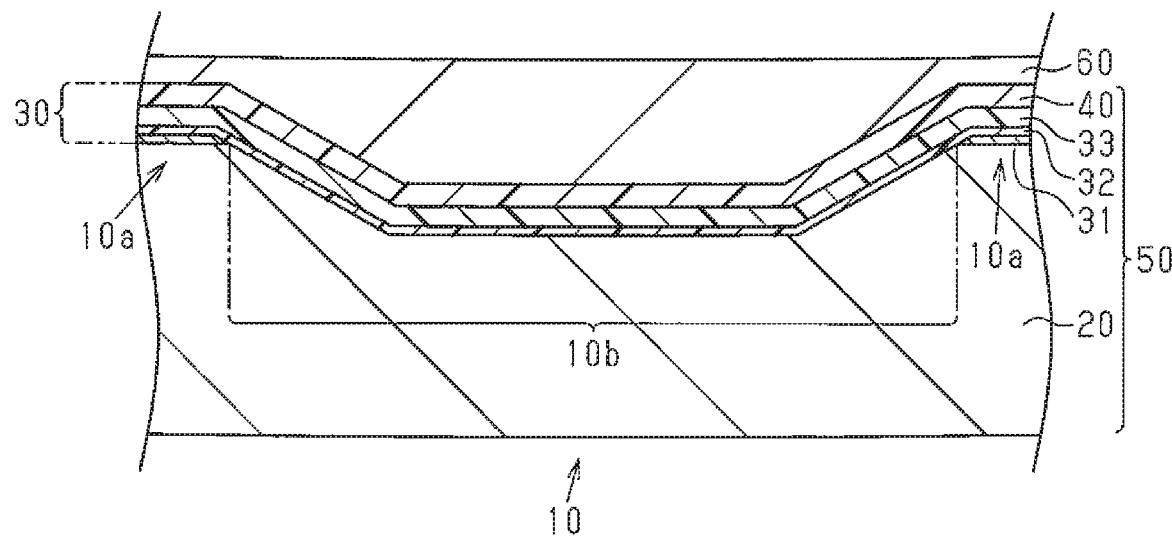
FIG. 2 is an enlarged cross-sectional view showing section A of FIG. 1.

First, with reference to FIGS. 1 and 2, the basic configuration of a radio-wave transmitting cover (hereinafter, referred to as a cover 10) will be described. In FIGS. 1 and 2, in order to make the size of each member recognizable, the scale of each member is altered as necessary.

The cover 10 is an emblem that is attached to the opening of the front grille on the front side of the automobile. The cover 10 is arranged in front of a millimeter wave radar device 90 in the traveling direction of the radio waves (millimeter waves) and is located in the path of the radio waves from the millimeter wave radar device 90. The wavelength λ of the radio waves from the millimeter wave radar device 90 of the present embodiment is, for example, 2.4 mm.

The cover 10 has a transparent member 20, which constitutes the surface of the cover 10. The transparent member 20 of the present embodiment is made of a polyester-based copolymerized polycarbonate having excellent impact resistance, weather resistance, and water absorption resistance.

As shown in FIG. 2, a decorative layer 30 and a lessening member 40 are provided on the back of the transparent member 20. The decorative layer 30 and the lessening member 40 are stacked in this order from the side closer to the front. The decorative layer 30 has a colored layer 31, a metal layer 32, and a corrosion preventing layer 33 in this order from the side closer to the front.

The colored layer 31 is printed on the back of the transparent member 20 and exhibits a black color, for example.

The metal layer 32 is made of a metallic material such as indium and deposited on the back of the colored layer 31 and on part of the transparent member 20 on which the colored layer 31 is not printed. The metal layer 32 has a thickness of about 20 nm.

In the present embodiment, the part in which the colored layer 31 is provided forms a background area 10a of the cover 10. In addition, the part in which the colored layer 31 is not provided, that is, the part in which the metal layer 32 is exposed through the transparent member 20, forms a character area 10b of the cover 10. In the cover 10 shown in FIG. 1, the part corresponding to the numeral "1" corresponds to the character area 10b.

The corrosion preventing layer 33 is configured to suppress corrosion of the metal layer 32 and is made of, for example, an acrylic or urethane-based plastic material. The corrosion preventing layer 33 has a thickness of about several tens of micrometers.

The lessening member 40 is configured to lessen the transfer of heat to the transparent member 20 at the time of the insert molding of a base 60, which will be described below. The lessening member 40 is made of, for example, a polyamide plastic. The thickness of the lessening member 40 is preferably within the range of, for example, 0.1 mm to 1.0 mm. If thermal damages to the transparent member 20 and the decorative layer 30 are negligible at the time of molding the base 60, the lessening member 40 can be omitted.

The base 60, which is made of acrylonitrile-ethylene-styrene copolymer (AES) plastic, is provided on the back of the lessening member 40.

In the present embodiment, the transparent member 20, the decorative layer 30, and the lessening member 40 constitute a front-side member 50.

In the present embodiment, the thickness d of the cover 10 at a reference position where the incident angle θ of the radio wave from the millimeter wave radar device 90 is 0° is defined as a reference thickness dP0. The reference thickness dP0 is set to a value obtained by multiplying half of the wavelength λ of the radio wave by an integer. In the present embodiment, the reference thickness dP0 is set to a value obtained by multiplying half of the wavelength λ (1.2 mm in the present embodiment) by five. That is, the reference thickness dP0 is set to 6.0 mm in the present embodiment. The incident angle θ of the radio wave is the angle defined by the normal line orthogonal to the tangent plane at each position of the cover 10 and the traveling direction of the radio wave.

Further, in the area around the reference position, the thickness d of the cover 10 is gradually changed such that the greater the distance from the reference position, the greater becomes the difference by which the thickness d of the cover 10 is larger than the reference thickness dP0.

The reciprocating millimeter wave attenuation, which is the attenuation when a radio wave travels back and forth through the cover 10, will be simply referred to as the radio wave attenuation. In this case, (Expression 1) to (Expression 8) below are satisfied among the incident angle θ of the radio wave from the millimeter wave radar device 90 at each position of the cover 10, the thickness d of the cover 10, and the radio wave attenuation (see "Antenna Engineering Handbook, 1st. ed. Chapter 32, McGraw-Hill Book Company").

$$\text{attenuation} = |2 \times \text{transmittance}| \quad \text{(Expression 1)}$$

$$\text{transmittance} = -20 \log \tau \quad \text{(Expression 2)}$$

$$\tau = \frac{(1-\gamma^2)\exp(-\varphi L_0 - j\varphi)}{1 - \gamma^2 \exp(-2\varphi L_0 - 2j\varphi)} \quad \text{(Expression 3)}$$

$$\varphi = \frac{2\pi d}{\lambda}\left(\frac{\varepsilon}{\varepsilon_0} - \sin^2\theta\right)^{1/2} \text{ radians} \quad \text{(Expression 4)}$$

Figure 3:
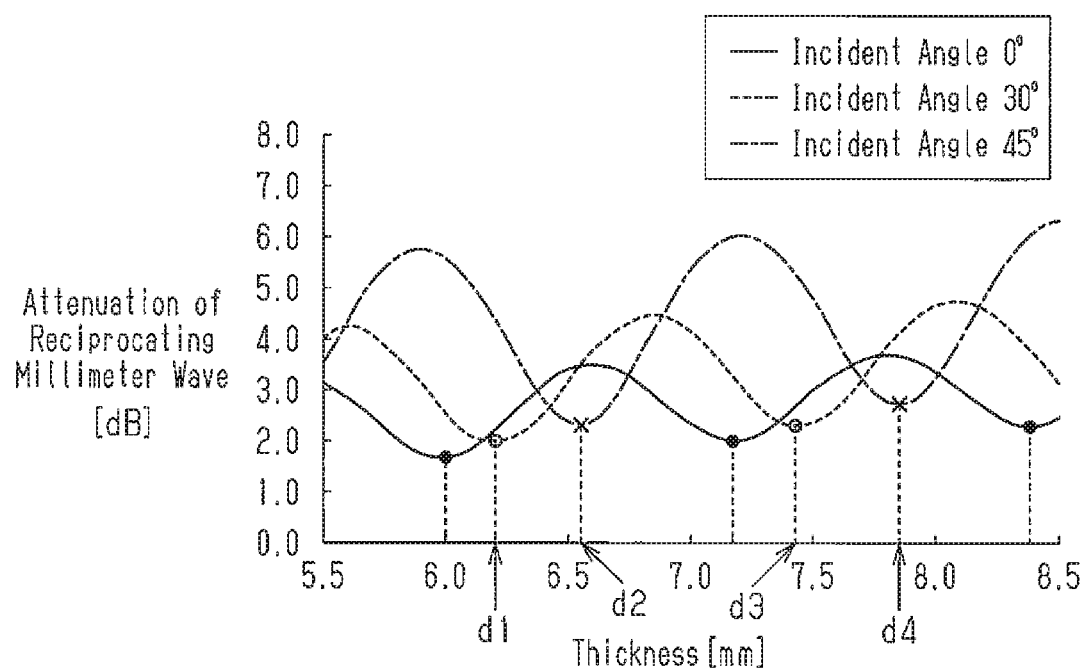
FIG. 3 is a graph showing the relationship between the thickness of the cover and the attenuation of a reciprocating millimeter wave at each incident angle.

-continued $$L_0 = \frac{(\varepsilon/\varepsilon_0)\tan\delta}{2(\varepsilon/\varepsilon_0 - \sin^2\theta)} \quad \text{(Expression 5)}$$

$$\gamma = \frac{1 - \sqrt{\varepsilon_e} + jL_1}{1 + \sqrt{\varepsilon_e} - jL_1} \quad \text{(Expression 6)}$$

$$\varepsilon_e = \begin{cases} \dfrac{(\varepsilon/\varepsilon_0) - \sin^2\theta}{\cos^2\theta} & \text{(perpendicular polarization)} \\ \dfrac{(\varepsilon/\varepsilon_0)^2\cos^2\theta}{(\varepsilon/\varepsilon_0) - \sin^2\theta} & \text{(parallel polarization)} \end{cases} \quad \text{(Expression 7)}$$

$$L_1 = \begin{cases} \dfrac{(\varepsilon/\varepsilon_0)\tan\delta}{2\cos\theta[(\varepsilon/\varepsilon_0) - \sin^2\theta]^{1/2}} & \begin{pmatrix}\text{perpendicular}\\ \text{polarization}\end{pmatrix} \\ \dfrac{(\varepsilon/\varepsilon_0)\tan\delta[(\varepsilon/\varepsilon_0) - 2\sin^2\theta]\cos\theta}{2[(\varepsilon/\varepsilon_0) - \sin^2\theta]^{3/2}} & \begin{pmatrix}\text{parallel}\\ \text{polarization}\end{pmatrix} \end{cases} \quad \text{(Expression 8)}$$

in (Expression 1) to (Expression 8),
τ: transmission coefficient of cover
φ: phase
$L_0$: attenuation by loss
λ: wavelength of radio wave
d: thickness of cover
ε: permittivity of cover
$\varepsilon_0$: permittivity of vacuum
θ: incident angle of radio wave
tan δ: dielectric loss tangent of cover
$\varepsilon_e$: transmission relative permittivity
γ: Fresnel reflection coefficient
$L_1$: reluctance due to loss of vertical polarization FIG. 3 shows the relationship between the thickness d of the cover 10 and the radio wave attenuation in the cases where the incident angle θ is 0°, 30°, and 45°. In the present embodiment, the radio wave attenuation is calculated by assigning values to the thickness d in increments of 0.01 mm with the incident angle θ fixed.

As indicated by the solid line in FIG. 3, when the incident angle θ is 0°, the radio wave attenuation has local minimums at thicknesses d of 6.0 mm, 7.2 mm, and 8.4 mm.

As indicated by the broken line in FIG. 3, when the incident angle θ is 30°, the radio wave attenuation has local minimums at certain values of the thickness d, namely at d1, which is greater than 6.0 mm and smaller than 6.5 mm, and d3, which is greater than 7.0 mm and smaller than 7.5 mm.

As indicated by the long dashed short dashed line in FIG. 3, when the incident angle θ is 45°, the radio wave attenuation has local minimums at certain values of the thickness d, namely at d2, which is greater than 6.5 mm and smaller than 7.0 mm, and d4, which is greater than 7.5 mm and smaller than 8.0 mm.

Therefore, in the present embodiment, the thickness d at each position of the cover 10, that is, the thickness d at each incident angle θ is set based on (Expression 1) to (Expression 8) such that the radio wave attenuation, which changes periodically according to the thickness d of the cover 10, has a local minimum.

As described above, there are multiple thicknesses where the radio wave attenuation is a local minimum. Therefore, in the present embodiment, the thickness d of the cover 10 is set to the thickness d closest to the reference thickness dP0 among the thicknesses of the cover 10 corresponding to the multiple local minimums of the radio wave attenuation.

That is, as indicated by the broken line in FIG. 3, in the present embodiment, the thickness d is set to d1, which is closer to 6.0 mm than d3 at the position where the incident angle θ is 30°.

Also, as indicated by the long dashed short dashed line in FIG. 3, in the present embodiment, the thickness d is set to d2, which is closer to 6.0 mm than d4 at the position where the incident angle θ is 45°.

In the present embodiment, as shown by the long dashed double-short dashed lines in FIG. 1, the intersections of an imaginary lattice on the cover 10 are defined as positions Px (in this case, x=1 to 15). The thicknesses d at the positions Px are calculated by the above-described method. The thickness d between two adjacent points (for example, between P1 and P2 or between P1 and P6) is calculated by the polynomial interpolation.

Figure 4:
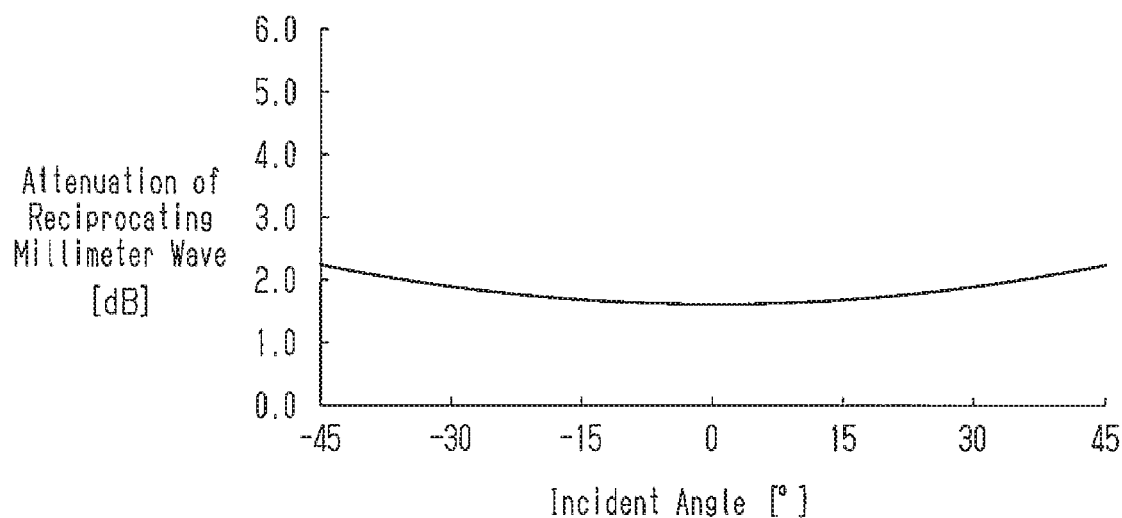
FIG. 4 is a graph showing the relationship between the incident angle of radio waves and the attenuation of a reciprocating millimeter wave in the cover of the first embodiment.

According to this method, as shown in FIG. 4, the radio wave attenuation is about 2 dB or less even in the region where the incident angle θ of the radio wave is 20° to 45°.

Figure 5:
FIG. 5 is a graph showing the relationship between the incident angle of radio waves and the attenuation of a reciprocating millimeter wave in the conventional cover having an even thickness.

In contrast, as shown in FIG. 5, in the case of a conventional cover with a constant thickness, the radio wave attenuation becomes larger than 2 dB when the incident angle θ of the radio wave is greater than 20°. Particularly, in the region where the incident angle θ of the radio wave is 30° or greater, the radio wave attenuation greatly increases from 3 dB to 6 dB as the incident angle θ increases.

The above-described radio-wave transmitting cover and the thickness setting method for the radio-wave transmitting cover according to the first embodiment described above achieve the following advantages.

(1) The thickness d at each position of the cover 10 is set based on (Expression 1) to (Expression 8), which are satisfied among the incident angle θ of the radio wave from the millimeter wave radar device 90 at the position, the thickness d of the cover 10, and the radio wave attenuation, such that the radio wave attenuation, which changes periodically according to the thickness d of the cover 10, has the local minimums.

With this method, the thickness d at each position of the cover 10, that is, the thickness d at each incident angle θ is set based on (Expression 1) to (Expression 8) such that the radio wave attenuation, which changes periodically according to the thickness d of the cover 10, has a local minimum. Therefore, it is possible to appropriately suppress the radio wave attenuation even in the region where the incident angle θ of the radio wave is large. This widens the angular range of detection of the millimeter wave radar device 90.

(2) The thickness d at the reference position in the cover 10, where the incident angle θ of the radio wave is 0°, is set as the reference thickness dP0. In this case, the thickness d of the cover 10 in the area surrounding the reference position is set to the thickness d closest to the reference thickness dP0 among the thicknesses of the cover 10 corresponding to the multiple local minimums of the radio wave attenuation.

This method prevents the thickness d of the cover 10 from greatly varying depending on the position. The shape of the cover 10 is thus simplified.

(3) The thickness d of the cover 10 is set to the reference thickness dP0 at the reference position, where the incident angle θ of the radio wave from the millimeter wave radar device 90 is 0°. The reference thickness dP0 is set to a value obtained by multiplying half of the wavelength λ of the radio wave by an integer. In the area around the reference position, the thickness d of the cover 10 is gradually changed such that the greater the distance from the reference position, the greater becomes the difference by which the thickness d of the cover 10 is larger than the reference thickness dP0.

This configuration achieves an advantage similar to the above-described advantage (1).

Second Embodiment

Figure 6:
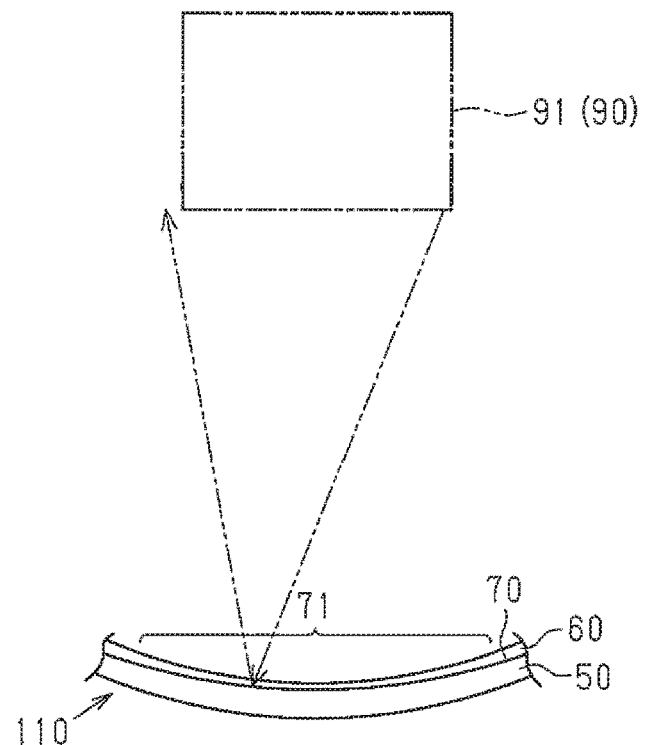
FIG. 6 is a diagram illustrating an example in which a radio wave is reflected by a cover according to a second embodiment.
Figure 7:
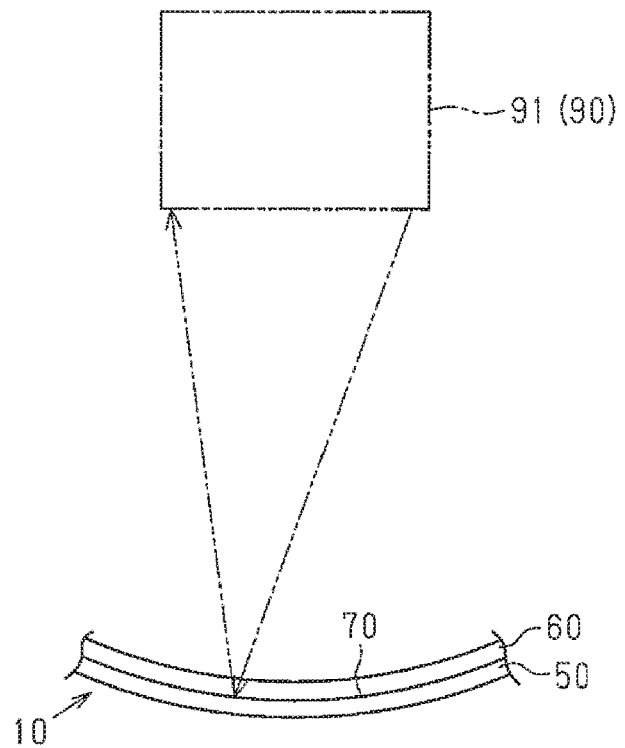
FIG. 7 is a diagram illustrating an example in which a radio wave is reflected by a cover according to a comparison example.

With reference to FIGS. 6 and 7, differences between the second embodiment and the first embodiment will be mainly discussed.

As in the cover 10 of the comparative example shown in FIG. 7, part of the radio wave from the millimeter wave radar device 90 may be reflected at an interface 70 between the base 60 and the front-side member 50. When such a reflected wave is detected by a detecting portion 91 of the millimeter wave radar device 90, the noise may increase. This is one cause of the deterioration of the detection accuracy of the millimeter wave radar device 90.

FIG. 6 illustrates a cover 110 according to the second embodiment, in which the thickness of the base 60 is made thin at the center of the base 60 and thicker in the area about the center. This provides a small curvature portion 71, in which the curvature is partially reduced, at the interface 70 between the base 60 and the front-side member 50.

With the cover 110, the incident angle increases when the radio wave enters the small curvature portion 71, which is provided at the interface 70 between the base 60 and the front-side member 50. This increases the angle of reflection when the radio wave is reflected at the small curvature portion 71. This restrains the reflected wave from the small curvature portion 71 from being detected by the detecting portion 91 of the millimeter wave radar device 90.

The above-described radio-wave transmitting cover and the thickness setting method for the radio-wave transmitting cover according to the second embodiment described above achieve the following advantage in addition to the advantages (1) to (3) of the first embodiment.

(4) The small curvature portion 71 is provided, in which the curvature is partially reduced, at the interface 70 between the base 60 and the front-side member 50.

With this configuration, since the above-described operation is performed, the deterioration of the detection accuracy of the millimeter wave radar device 90 is suppressed without changing the shape of the back surface of the cover 110.

Third Embodiment

A third embodiment will now be described with reference to FIG. 8.

Figure 8:
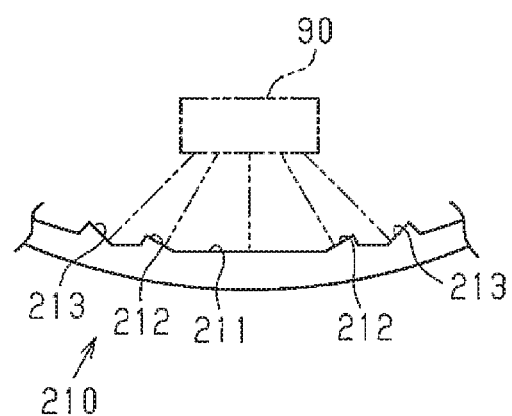
FIG. 8 is a diagram illustrating an example in which radio waves are incident on a cover according to a third embodiment.

FIG. 8 illustrates a cover 210 of the third embodiment, in which vertical surface portions 211 to 213 are provided on the back of the cover 210. The radio wave from the millimeter wave radar device 90 is vertically incident on the vertical surface portions 211 to 213. Although not shown, the cover 210 of the third embodiment also has a base and a front-side member similarly to the first and second embodiments.

The vertical surface portion 211, which is located at the center in the width direction, is a portion corresponding to the range of the incident angle θ of 0° to 20° in the first embodiment.

Two vertical surface portions 212 are provided on the outside in the width direction of the vertical surface portion 211, respectively, and are portions that correspond to positions where the incident angle θ is 30° in the first embodiment.

Two vertical surface portions 213 are provided on the outside in the width direction of the two vertical surface portions 212, respectively, and are portions that correspond to positions where the incident angle θ in the first embodiment is 45°.

The thickness d at each position of the cover 210 is set such that the thickness of the cover 210 in the normal direction of each of the vertical surface portions 211 to 213 is obtained by multiplying half of the wavelength of the radio wave by an integer.

The above-described radio-wave transmitting cover and the thickness setting method for the radio-wave transmitting cover according to the third embodiment described above achieve the following advantages.

(5) The vertical surface portions 211 to 213, on which the radio wave is vertically incident, are provided on the back of the cover 210. The thickness of the cover 210 is set such that the thickness of the cover 210 in the normal direction of each of the vertical surface portions 211 to 213 is obtained by multiplying half of the wavelength of the radio wave by an integer.

With this method, the radio wave is vertically incident on the respective vertical surface portions 211 to 213 on the back of the cover 210. Further, the thickness of the cover 210 in the normal direction of each of the vertical surface portions 211 to 213 is obtained by multiplying half of the wavelength of the radio wave by an integer. Therefore, it is possible to appropriately suppress the radio wave attenuation even in the region where the incident angle of the radio wave is large.

Modifications

The above-described first to third embodiments may be modified as follows.

In the first to third embodiments, the radio-wave transmitting cover according to the present invention is employed as an automobile emblem, but the cover can also be employed as another part such as a front grille.

In the first embodiment, the thickness d may be set to d3 at a position where the incident angle θ is 30°. Further, at a position where the incident angle θ is 45°, the thickness d may be set to d4.

In the first embodiment, the thickness d of the cover 10 is set such that the radio wave attenuation, which changes periodically in accordance with the thickness d of the cover 10, has local minimums. However, the thickness d at each position of the cover 10 can be made about 0.1 mm thicker or about 0.1 mm thinner than the thickness d, which is a local minimum. Even in this case, the radio wave attenuation is suppressed in a region where the incident angle θ of the radio wave is larger than that of a conventional cover, in which the thickness d is constant.

The lamination structure of the front-side member 50 can be changed as necessary.

The invention claimed is:

1. A radio-wave transmitting cover, which is configured to be arranged in a path of a radio wave of a radio-wave radar device, wherein a thickness of the cover is set to a reference thickness at a reference position where an incident angle of the radio wave from the radio-wave radar device is 0°, the reference thickness is set to a value obtained by multiplying half of a wavelength of the radio wave by an integer so that a radio wave attenuation, which changes periodically according to the thickness of the cover, has a local minimum, and in an area around the reference position, the thickness of the cover is gradually changed such that the greater a distance from the reference position, the greater becomes a difference by which the thickness of the cover is larger than the reference thickness, such that the radio wave attenuation, which changes periodically according to the thickness of the cover, has a local minimum, wherein the cover includes a base, which has a back on which the radio wave from the radio-wave radar device is incident, and a front-side member, which is provided on a surface on a side opposite to the back of the base, and a small curvature portion in which a curvature is partially reduced is provided at an interface between the base and the front-side member.

2. A method for setting a thickness of a radio-wave transmitting cover, which is configured to be arranged in a path of a radio wave of a radio-wave radar device, the method comprising:

setting the thickness at each position of the cover based on the following (Expression 1) to (Expression 8) that are satisfied among an incident angle at the position of a radio wave from the radio-wave radar device, the thickness of the cover, and an attenuation of the radio wave, such that the radio wave attenuation, which changes periodically according to the thickness of the cover, has a local minimum attenuation=|2×transmittance|     (Expression 1)

transmittance=−20 log τ     (Expression 2)

$$\tau = \frac{(1-\gamma^2)\exp(-\varphi L_0 - j\varphi)}{1-\gamma^2 \exp(-2\varphi L_0 - 2j\varphi)} \quad \text{(Expression 3)}$$

$$\varphi = \frac{2\pi d}{\lambda}\left(\frac{\varepsilon}{\varepsilon_0} - \sin^2\theta\right)^{1/2} \text{ radians} \quad \text{(Expression 4)}$$

$$L_0 = \frac{(\varepsilon/\varepsilon_0)\tan\delta}{2(\varepsilon/\varepsilon_0 - \sin^2\theta)} \quad \text{(Expression 5)}$$

$$\gamma = \frac{1-\sqrt{\varepsilon_e} + jL_1}{1+\sqrt{\varepsilon_e} - jL_1} \quad \text{(Expression 6)}$$

$$\varepsilon_e = \begin{cases} \dfrac{(\varepsilon/\varepsilon_0) - \sin^2\theta}{\cos^2\theta} & \text{(perpendicular polarization)} \\ \dfrac{(\varepsilon/\varepsilon_0)^2\cos^2\theta}{(\varepsilon/\varepsilon_0) - \sin^2\theta} & \text{(parallel polarization)} \end{cases} \quad \text{(Expression 7)}$$

$$L_1 = \begin{cases} \dfrac{(\varepsilon/\varepsilon_0)\tan\delta}{2\cos\theta[(\varepsilon/\varepsilon_0) - \sin^2\theta]^{1/2}} & \begin{pmatrix}\text{perpendicular}\\ \text{polarization}\end{pmatrix} \\ \dfrac{(\varepsilon/\varepsilon_0)\tan\delta[(\varepsilon/\varepsilon_0) - 2\sin^2\theta]\cos\theta}{2[(\varepsilon/\varepsilon_0) - \sin^2\theta]^{3/2}} & \begin{pmatrix}\text{parallel}\\ \text{polarization}\end{pmatrix} \end{cases} \quad \text{(Expression 8)}$$

(Expression 8)
in (Expression 1) to (Expression 8),
τ: transmission coefficient of cover
φ: phase
$L_0$: attenuation by loss
λ: wavelength of radio wave
d: thickness of cover
ε: permittivity of cover
$\varepsilon_0$: permittivity of vacuum
θ: incident angle of radio wave
tan δ: dielectric loss tangent of cover
$\varepsilon_e$: transmission relative permittivity
γ: Fresnel reflection coefficient
$L_1$: reluctance due to loss of vertical polarization.

3. The method for setting a thickness of a radio-wave transmitting cover according to claim 2, wherein
the thickness of the cover at a reference position where the incident angle of the radio wave is 0° is defined as a reference thickness, and
the method further comprises setting the thickness of the cover in an area around the reference position to a thickness that is closest to the reference thickness among thicknesses of the cover corresponding to local minimums of the radio wave attenuation.

\* \* \* \* \*